July 4, 1972 H. STREICHER ET AL 3,674,351

READER FOR INFORMATION CARRIERS IN SHEET FORM

Filed Nov. 12 1969 4 Sheets-Sheet 1

HEINZ STREICHER
SIEGFRIED RIEK
MANFRED LEUTWEIN
INVENTORS

BY R. Lewis Gable
Robert W Hampton
ATTORNEYS

HEINZ STREICHER
SIEGFRIED RIEK
MANFRED LEUTWEIN
INVENTORS

BY R. Lewis Gable
Robert W. Hampton
ATTORNEYS

READER FOR INFORMATION CARRIERS IN SHEET FORM
Filed Nov. 12 1969
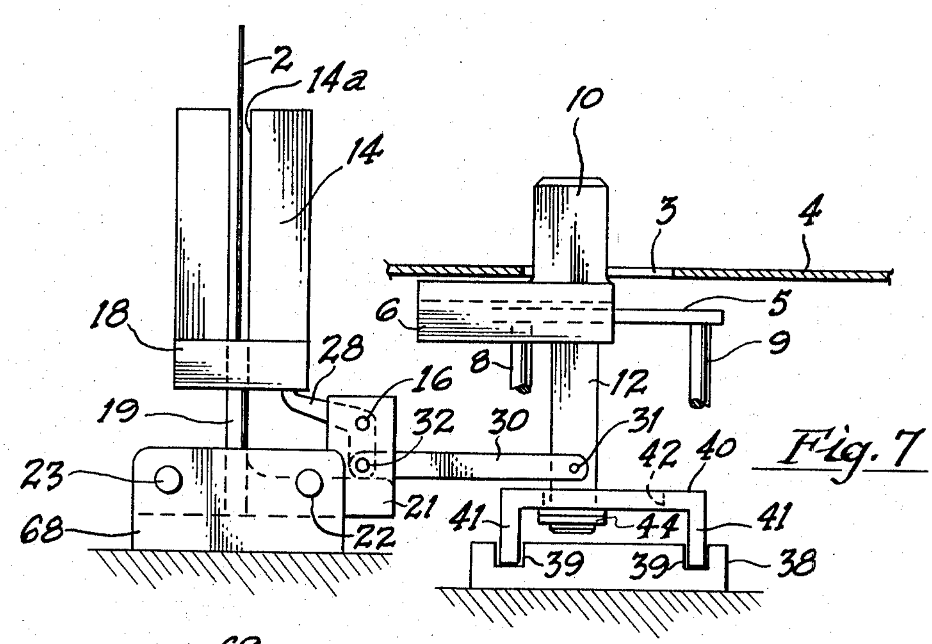
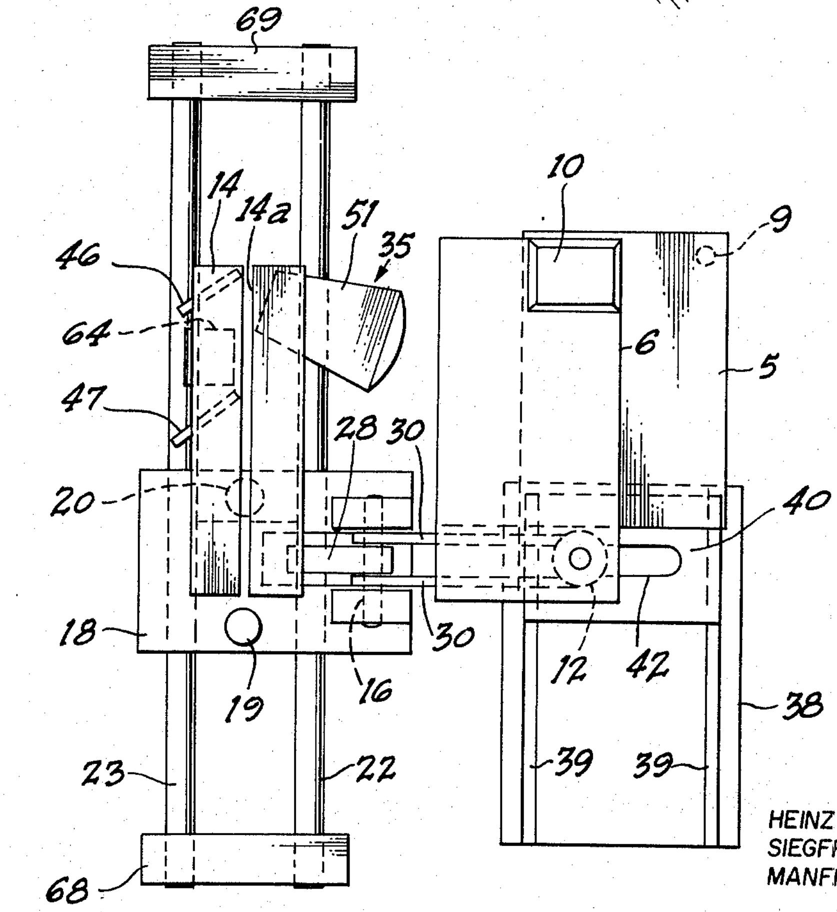
Fig. 8
HEINZ STREICHER
SIEGFRIED RIEK
MANFRED LEUTWEIN
INVENTORS
BY R. Lewis Gable
Robert W Hampton
ATTORNEYS

HEINZ STREICHER
SIEGFRIED RIEK
MANFRED LEUTWEIN
INVENTORS

BY R. Lewis Gable
Robert W. Hampton
ATTORNEYS 3,674,351

READER FOR INFORMATION CARRIERS IN SHEET FORM

Heinz Streicher, Echterdingen, Siegfried Riek, Esslingen-Weil, and Manfred Leutwein, Rommelshausen, Germany, assignors to Eastman Kodak Company, Rochester, N.Y.

Filed Nov. 12, 1969, Ser. No. 875,815

Claims priority, application Germany, Nov. 26, 1968, P 18 10 959.6

Int. Cl. G03b *23/08*

U.S. Cl. 353—27 5 Claims

ABSTRACT OF THE DISCLOSURE

Apparatus is disclosed for projecting images from information bearing media such as microfiche cards having at least first and second image portions, the projection apparatus including first and second lens or projection assemblies disposed to project images from the first and second image bearing portions. At least one of the first and second lens assemblies being mounted to be movable with respect to the image bearing media to permit the one lens assembly to project the first image and the other lens assembly to project the second image. In a preferred embodiment, the first and second lens assemblies may project the first and second images from the microfiche onto adjacent display screens or surfaces.

CROSS REFERENCES TO RELATED APPLICATIONS

Reference is made to commonly assigned copending U.S. patent application Ser. No. 875,791, entitled "Reader for Information Carriers in Sheet Form," filed Nov. 12, 1969 in the names of Manfred Leutwein, Heinz Streicher and Siegfried Riek; commonly assigned copending U.S. patent application Ser. No. 875,792, entitled "Reader for Information Carriers in Sheet Form," filed Nov. 12, 1969 in the names of Manfred Leutwein and Heinz Streicher; and commonly assigned copending U.S. patent application Ser. No. 29,212, entitled "Viewer," filed Apr. 16, 1970 in the name of Ulrich Staiger.

BACKGROUND OF THE INVENTION

Field of the invention

This invention relates to apparatus for projecting images derived from information bearing media such as microfiche cards and in particular, to apparatus for projecting images from the media onto a display screen or surface.

Description of the prior art

Apparatus for projecting images from information bearing media are known in the art as exemplified by French Pat. 901,705. There is disclosed in the aforementioned French patent a projection apparatus or reader having a projection lens which is displaceably mounted to one side of an information carrier subdivided in rows, an illumination source and a viewing mask being displaceably mounted to the other side of the carrier to permit each portion of the information carrier to be selectively projected onto a display screen as a single frame. However, this reader allows projection onto the screen of but a single, partial image such as a particular image selected from a plurality of images disposed on a microfiche card. Such a reader does not meet the requirements often occurring in practice. For example, publications, texts, and patents in the field of science and technology are generally composed of a text portion and an illustrative portion including drawings, formulas and the like related to the text portion. When reading these documents, it is not only desirable but in most cases necessary for a clear understanding thereof for the reader to observe the text portion and also the illustrative portion of the publication. However, it is rare that the descriptive portion and the corresponding illustrative portion appear on the same page so that both could be recorded on a single frame or image portion of an information bearing media. Instead, the text portion and the illustrative portion are often disposed on several pages, and it may even occur that several pages of text relate to a single drawing or several pages of drawings correspond to a single page of textual material. In each of these instances, the reading of projected images onto a display screen from microfiche by means of the prior art readers are at best incomplete and time consuming and generally unsatisfactory to the reader.

It is therefore the object of this invention to permit the projection of more than one image from a single information bearing media and in particular, to display the image portions so projected or adjacent portions of a display screen or surface.

SUMMARY OF THE INVENTION

This and other objects are accomplished in accordance with the teachings of this invention by providing apparatus for projecting images from an information bearing medium having at least first and second image portions and including first and second lens or projection assemblies for projecting images from the first and second image bearing portions. The first lens or projection system is selectively movable to project a different portion of the image bearing medium. In a preferred embodiment of this invention, the first and second lens assemblies project images onto adjacent portions of a display screen or surface (or two separate surfaces disposed adjacent to each other) so that the viewer may simultaneously observe the display images.

The invention, and its objects and advantages will become more apparent in the detailed description of the preferred embodiment presented below.

BRIEF DESCRIPTION OF THE DRAWINGS

In the detailed description of the preferred embodiment on the invention presented below, reference is made to the accompanying drawing in which:

FIGS. 7 and 8 are respectively side and top views of the displacement mechanism shown in FIG. 6.

DESCRIPTION OF THE PREFERRED EMBODIMENT

Figure 1:
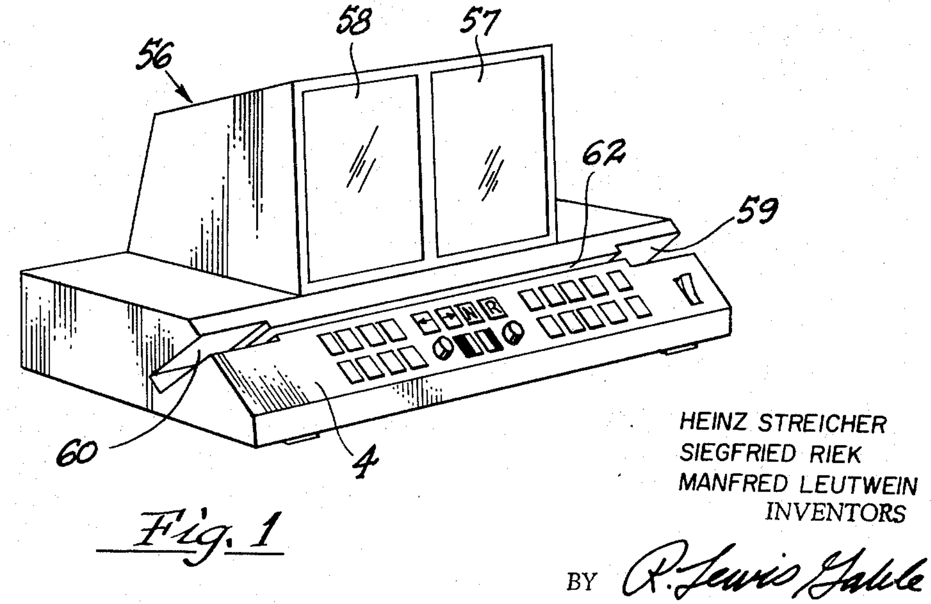
FIG. 1 is a perspective view of a reader or viewer incorporating the lens or projection systems in accordance with the teachings of this invention.
Figure 3:
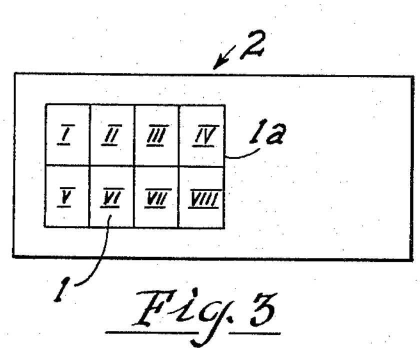
FIG. 3 is a view of an information bearing medium which may be inserted into viewer of FIG. 1 and which has image portions to be projected onto the screen thereof.

With reference to the drawings and in particular to FIG. 1, there is shown a reader 56 having on the front thereof first and second viewing screens or display surfaces 57 and 58. Further, a pair of recesses 59 and 60 are disposed on the sides thereof the receive a plurality (or stack) of image bearing media taking the form of an aperture card 2 shown in FIG. 3. The aperture cards 2 placed in the recess 59 are transported one at a time along a feed path 63 by a transport mechanism more fully described in the above identified copending application to Leutwein, Streicher and Riek. As will be described in detail later, images from a single image bearing medium may be projected onto the viewing screens 57 and 58 to facilitate the study and easy correlation ot the distinct image portions stored on the aperture card 2.

Figure 2:
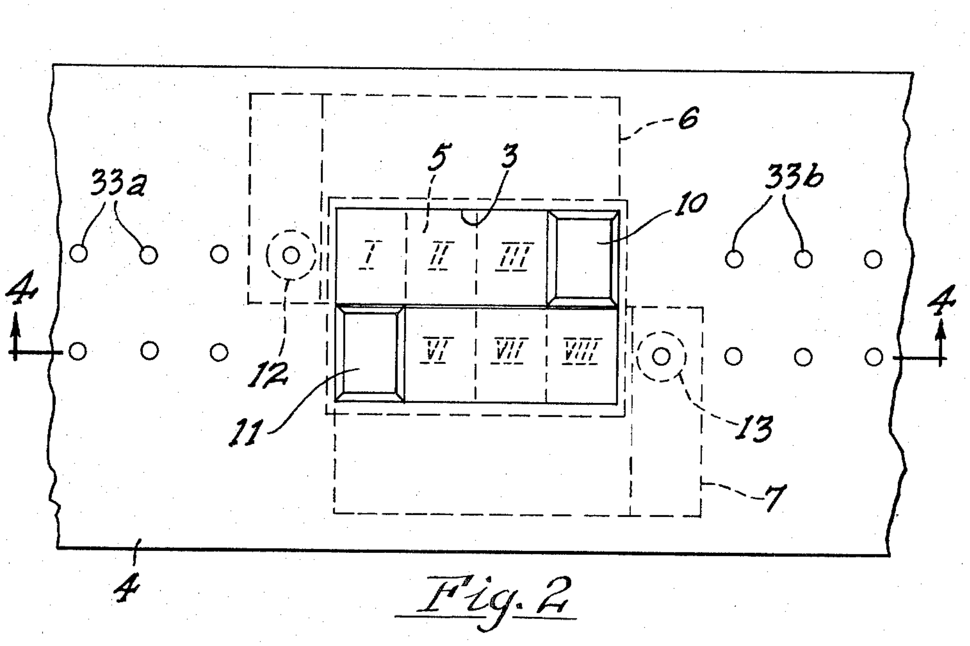
FIG. 2 is a plan view of the control panel of the viewer shown in FIG. 1 showing the members provided for displacement of the two projection or lens systems.

As shown in FIG. 2, the aperture card 2 has an aperture (or window) 1*a* therein for receiving an information bearing medium in the form of a film chip 1. Eight microfilm images or image portions I to VIII are provided on the film chip 1 mounted in the aperture card 2 which serves as the information carrier in sheet form. The eight image portions are arranged in two equal rows, with images I to IV being disposed in the "upper optical plane" and images V to VIII disposed in the "lower optical plane" as shown in FIG. 2. Illustratively, the images are separated from each other by interstitial portions of approximately 1 mm. thickness. The projection screens 57 and 58 correspond in size illustratively to two vertical or horizontal DIN–A4 surfaces.

Figure 5:
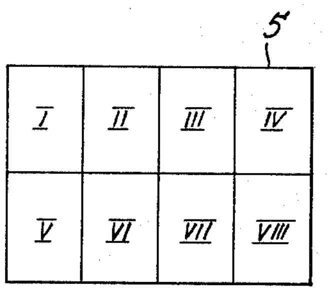
FIG. 5 is a planned view of a plate having thereon indicia to assist the selective movement of the members shown in FIGS. 2 and 4.
Figure 4:
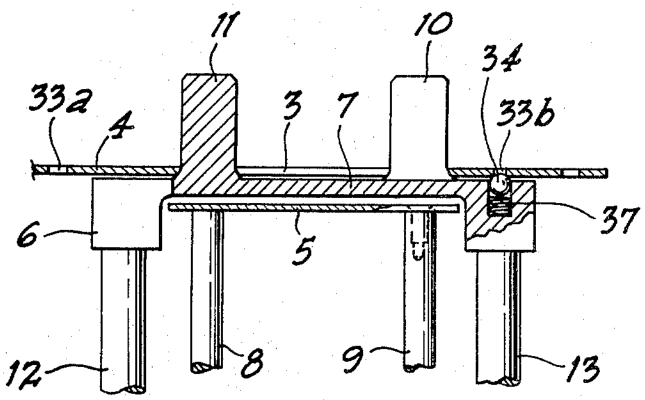
FIG. 4 is an enlarged, sectioned view taken along lines of IV—IV of FIG. II further showing the mechanism for selectively positioning the lens systems of this invention.

To facilitate the selective projection of two image portions of the film chip 1 and to display the selected image portions on the display screens, a pair of image projection systems 35 and 36, at least one of which may be selectively positioned, are provided in accordance with the teachings of this invention. With reference to FIGS. 1 and 2, the reader 56 is provided with a control panel 4 having a recess or opening 3 therein. A marking plate 5 is disposed beneath the recess 3 and is supported, as shown in FIG. 4, by a pair of stationary support members 8 and 9. Further, first and second guide plates 6 and 7 are suspended above the marking or indicia plate 5 and may be moved respectively by first and second actuating studs or knobs 10 and 11 to thereby selectively adjust the position of image projection systems 35 and 36. As shown in FIGS. 2 and 5, the marking plate is provided with a plurality of indicia corresponding to the position and arrangement of the image portions I to VIII of the film chip 1. The guide plates 6 and 7 are displaceably mounted between the marking plate 5 and the control panel 4 to facilitate the movement of the essential parts to the lens operation of the reader 56. In order to permit the operator to correctly place the knobs 10 and 11 with respect to the indicia on marking plate 5, the guide plates 5 and 6 may be made in one embodiment of a transparent material. Further, the guideplate 6 is secured to an operating stud or linkage rod 12 which is operably connected with a support member 14 associated with the image projection system 35. In a similar manner, the guideplate 7 is operatively coupled to an operating stud or linkage rod 13 which is functionally coupled to a support member 15 upon which is mounted the image projection system 36.

Figure 9:
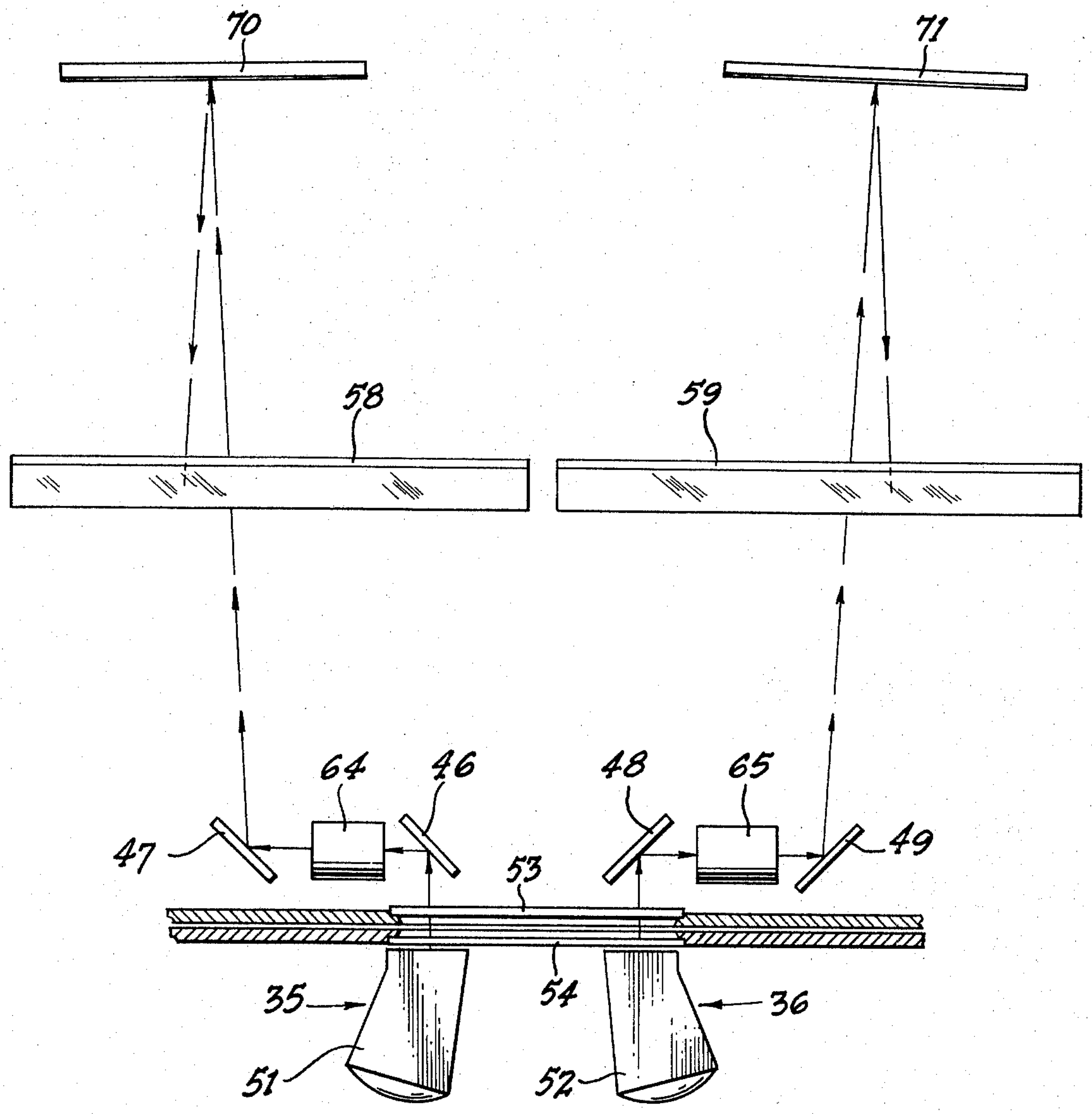
FIG. 9 is a schematic view showing the projection systems in accordance with the teachings of the invention and the optical path of projection of the images onto the screens of the reader shown in FIG. 1.

As shown in FIG. 9, the image projection system 35 includes a light projection system 51 having a source of illumination and a condenser lens system for illuminating a portion of the film chip 1, and a lens system 64 for focusing the image onto the display surface or screen 58. The optical path of the projected image as shown in FIG. 9 begins at the light projection system 51 and is reflected from a mirror or reflective surface 46 through the lens system 64 to be successively reflected from a pair of mirrors or reflective surfaces 47 and 70 onto the screen 58. When the film chip 1 is disposed between a pair of glass flaps 53 and 54, an image portion thereof will also be projected by the image projection system 36 onto the screen 59. More specifically, the image projection system 36 includes the light projection system 52 which illuminates a different or second image portion of the film chip 1. The illuminated image is reflected by a mirror 48 through a lens system 65 onto a mirror or reflective surface 49. The focused image is then reflected by a mirror or reflective surface 71 onto the display screen or surface 59. In an illustrative embodiment of this invention, the image projection systems 35 and 36 may take the form of the optical system disclosed in the above identified application to Staiger.

As will be now explained, the knobs or studs 10 and 11, as shown in FIG. 2, may be manipulated to thereby position the image projection systems 35 and 36 to selectively project various image portions I to VIII of the film chip 1. With regard to FIGS. 7 and 8, the stud or linkage rod 12 is operatively coupled to the support member 14 by a pair of linkage rods 30 connected to the linkage rod 12 by a connecting pin 31. As more clearly shown in FIG. 6, the support member 14 is attached to a sliding shoe 18. The sliding shoe 18 has a pair of apertures 18*a* therethrough for receiving respectively a pair of studs 19 and 20 along which the sliding shoe 18 may be moved readily in rectilinear motion. The linkage rods 30 are in turn connected by a connecting pin 32 to a lever or engaging member 28 which is pivotally mounted about a shaft 16. Thus, as the knob 10 is moved to the right as shown in FIG. 7, the operating stud 12 and the linkage rods 30 are directed to the right to thereby rotate the engaging member 28 in a counter-clockwise direction about the shaft 16 and to thereby lower the sliding shoe 18 and the support member 14. As a result, the image projection system 35 which is connected to the support member 14 will be lowered as seen in FIG. 6 to be aligned with one of the images V to VIII on the film chip 1.

Figure 6:
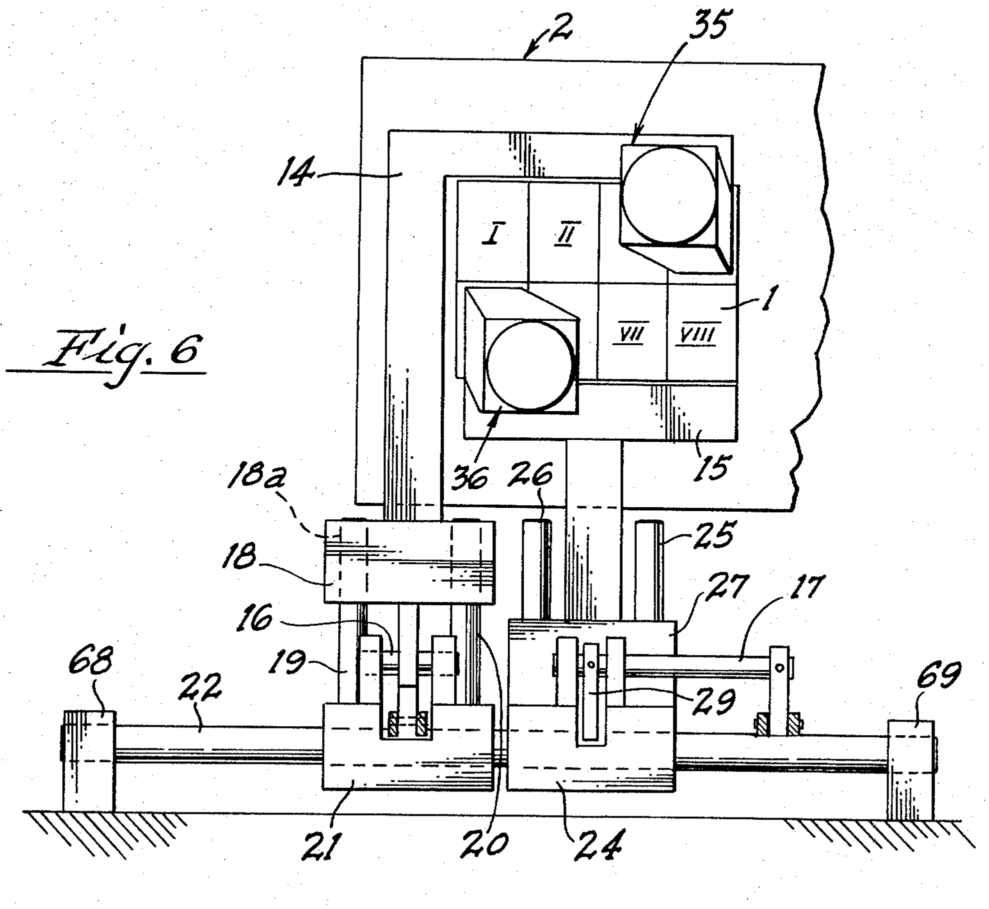
FIG. 6 is a front view of the mechanism for displacing the projection or lens systems in accordance with the teachings of this invention.

Further, the support member 14 and therefore the image projection system 35 is mounted for movement in a horizontal direction by a sliding shoe 21 upon which the studs 19 and 20 are fixedly mounted as shown in FIG. 6. The sliding shoe 21 has a pair of openings therethrough for receiving guide members 22 and 23 which are supported at either end by support members 68 and 69. As shown particularly in FIGS. 7 and 8, the linkage rod 12 is inserted through an elongated opening 42 within a U-shaped tracking member 40 and is connected thereto by a fastener 44 affixed to one end of the linkage rod 12. The U-shaped tracking member 40 has a pair of leg portions 41 which are inserted within respectively a pair of slots 39 of a base member 38. Thus, the knob 10 may be moved in an upward direction as seen in FIG. 8 to thereby move the tracking member 40, the sliding shoe 21, the support member 14 and the image projection system 35 in a corresponding, upward direction.

In a similar manner, the image projection system 36 is mounted upon a support member 15 which in turn is affixed to a sliding shoe 27. As shown in FIG. 6, the sliding shoe 27 is provided with a pair of openings therethrough for receiving studs 25 and 26 along which the sliding shoe 27 may be directed in a rectilinear motion. A lever or engaging member 29 is rotatively mounted upon a shaft 17. The shaft 17 is elongated and extends from the sliding shoe 27 and may be rotated in a manner similar to that described with regard to the linkage mechanism associated with knob 10. In addition, the studs 25 and 26 are connected to a sliding shoe 24 which is mounted in a sliding relationship upon the guide members 22 and 23 so as to move the sliding shoe 24, the support member 15 and the projection system 36 along a horizontal path to enable the image projection system 36 to be aligned with a different image portion of the film chip 1.

Thus, when the actuation stud or knob 10 is manipulated with respect to the markings I to IV of the marking plate 5 as shown in FIGS. 5 and 8, the support member 14 and the image projection system 35 are raised by the shaft 16 and lever or engaging member 28. As a result, the image portion I of IV of the film chip 1 is then aligned with the optical axis of the image projection system 35 and will be projected onto the display screen 58. Similarly, the movement of the knob 11 to a position above the indicia IV to VIII upon marking plate 5, the image projection system 36 will be raised by way of shaft 17 and the lever or engaging member 29. The studs 19, 20, 25 and 26 insure a smooth upward and downward motion of the sliding shoes 18 and 27. Upon lateral displacement of the actuation studs 10 and 11, the corresponding projection systems are moved along a row of image portions of the film chip 1 as the sliding shoes 21 and 24 move along the guiding members 22 and 23. As shown in FIGS. 2 and 4, each image portion or frame position is associated with a stop opening 33*a* or 33*b*; thus, as either the knob 11 is moved to a different position, a detent ball 34 will be biased by a spring 37 to engage one of the stop openings 33*b* to thereby accurately position the knob 11 and therefore the image projection system 36 with respect to the film chip 1. It may be understood that a detent ball similar to the ball 34 may be mounted upon the plate 6 to accurately position the lens system 35.

By providing the marking plate 5 and the guide plates 6 and 7 with different colors, the projection positions indicated on the control panel 4, as well as the remaining possibilities of subsequent settings, will become readily apparent. When the marking plate 5 is green, the guideplate 6 is made red and the guideplate 7 is made yellow, for example, the setting possibilies are readily observable through the opening 3. Thus, the actuation knobs 10 and 11 may be moved across all of the green surfaces of the marking plate 5, whereas the red partial surfaces cannot be reached by the yellow guide plate 6 and the yellow surfaces cannot be reached by the red guide plate 6. Of course, these conclusions apply only if a particular starting position is considered as being given, for in general every image portion can be reached. The exceptions in this illustrative embodiment being that image portion 1 cannot be reached by knob 11 and that image portion VIII cannot be reached by actuation knob 10.

The invention has been described in detail with particular reference to the preferred embodiment thereof, but it will be understood that variations and modifications can be affected within the spirit and scope of the invention.

We claim:

1. Apparatus for projecting separate images from an information bearing medium having a plurality of image bearing portions comprising:

means for supporting an information bearing medium having a plurality of image bearing portions, first and second means for projecting separate images from a supported information bearing medium, first and second selectively movable support means for respectively supporting said first and second means for projecting, first and second control members each being operatively coupled respectively to said first and second support means, and an indicia member having a surface having a plurality of indicia corresponding to said plurality of image bearing portions of said information bearing medium, said surface of said indicia member being disposed with respect to said first and second control members to facilitate the accurate placement of said control members with respect to said indicia member surface.

2. Apparatus as claimed in claim 1 wherein said first and second control members are respectively affixed to first and second guide plates.

3. Apparatus as claimed in claim 2 wherein said first and second guide plates are displaceably mounted upon said indicia member surface.

4. Apparatus for projecting separate images from an information bearing medium having a plurality of image bearing portions comprising:

means for supporting an information bearing medium having a plurality of image bearing portions, first and second means for projecting separate images from a supported information bearing medium, first and second selectively movable support means for respectively supporting said first and second means for projecting, first and second control members respectively operatively coupled to said first and second support means, said first and second control members also being operatively coupled to stop means for fixing the position of said control members at discrete positions corresponding to the spacing and position of said plurality of image bearing portions on said information bearing medium.

5. Apparatus as claimed in claim 4 wherein said indicia member surface and said guide plates are of a different color.

References Cited

UNITED STATES PATENTS

| | | | |
|---|---|---|---|
| 3,463,583 | 8/1969 | Collis | 353—89 X |
| 2,481,850 | 9/1949 | Lindner | 353—27 |
| 3,424,524 | 1/1969 | Akiyama et al. | 353—27 |

FOREIGN PATENTS

| | | | |
|---|---|---|---|
| 901,705 | 11/1944 | France | 353—27 |
| 54,403 | 10/1949 | France | 353—26 |

HARRY N. HAROIAN, Primary Examiner

U.S. Cl. X.R.

353—94